Figure 1:
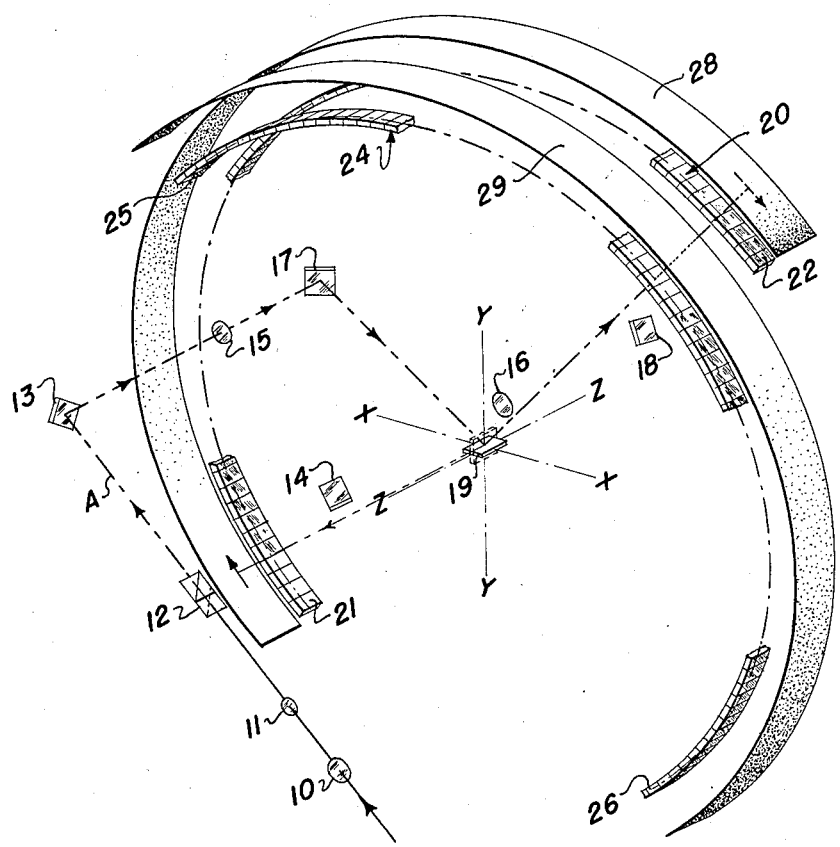

Feb. 9, 1954          B. BRIXNER          2,668,473
CONTINUOUS RECORDING HIGH SPEED FRAME CAMERA
Filed Jan. 7, 1953          7 Sheets-Sheet 1

WITNESSES:

INVENTOR:
Berlyn Brixner
BY

Feb. 9, 1954          B. BRIXNER          2,668,473

CONTINUOUS RECORDING HIGH SPEED FRAME CAMERA

Filed Jan. 7, 1953          7 Sheets-Sheet 2

WITNESSES:

INVENTOR:
Berlyn Brixner
BY

INVENTOR:
Berlyn Brixner

Feb. 9, 1954  B. BRIXNER  2,668,473
CONTINUOUS RECORDING HIGH SPEED FRAME CAMERA
Filed Jan. 7, 1953  7 Sheets-Sheet 5

WITNESSES:

INVENTOR:
Berlyn Brixner
BY

Feb. 9, 1954 B. BRIXNER 2,668,473
CONTINUOUS RECORDING HIGH SPEED FRAME CAMERA
Filed Jan. 7, 1953 7 Sheets-Sheet 7

WITNESSES:

INVENTOR:
Berlyn Brixner

Patented Feb. 9, 1954

2,668,473

UNITED STATES PATENT OFFICE 2,668,473

CONTINUOUS RECORDING HIGH SPEED FRAME CAMERA

Berlyn Brixner, Los Alamos, N. Mex., assignor to the United States of America as represented by the United States Atomic Energy Commission Application January 7, 1953, Serial No. 330,131

4 Claims. (Cl. 88—16)

This invention relates to high speed cameras and more particularly to a stationary film, rotating mirror, framing camera.

The invention described herein is a high speed framing camera especially suitable for the scientific study of explosive phenomena and the photography of high speed events which are self-luminous or illuminated by very intense explosive light sources such as use, for example, an argon atmosphere. The optical speed of this photographic device is such that images of sufficient size and good resolution may be reproduced at the repetition rate of millions of frames per second. In the presently preferred embodiment of this camera a repetition rate of 3,500,000 frames per second is achieved and by using an effective aperture of f/26 a final image size of 12 x 14 mm. is obtained on 35 mm. film. Dynamic resolution tests using Shell Burst Panchromatic film give a resolution of 30 lines per mm. over the entire picture area.

In the design of cameras to be used in high speed photography it does not appear feasible to employ photographic devices of the type known as film movement cameras due to the acceleration strains and frictional forces on the photographic film. The upper limit of repetition rate by this method is approximately 10,000 frames per second for frames of usable size. In order to achieve repetition rates in the range necessary for scientific investigation of detonation and similar phenomena it has been necessary to develop different film transport methods. One of the foremost methods of utilizing these different film transport techniques is the drum camera wherein the film is placed in a drum which is rotated at high speed past the optical components, or wherein the film is stationary in a fixed drum and the succession of images is formed optically on the film surface by rotating optical parts.

The present invention is a camera of the latter type, which, due to its optical system, is capable of repetition speeds far in excess of any camera heretofore known to the art. Framing cameras operating at speeds up to 500,000 frames per second have been built but the necessary size of the rotating optical parts limits the rotational speed possible.

In cameras employing rotating optical parts the limit of picture-repetition rate is primarily set by the rate of rotation at which the reflecting element of the optical system spins. In cameras of the prior art this speed of rotation has been in turn limited by the bursting speed of the rotating optical part. In order to achieve a sufficient duration of recording time at high repetition rates, cameras of the prior art have been obliged to employ rotating optical parts of complex geometrical design and enlarged size, thus lowering the bursting speed of such parts. The camera described herein, by using a dual optical system, allows the optical part to be kept to the most efficient size with respect to the size of the image produced and at the same time allows sufficient recording time at high speed without enlarging the rotating part.

It is an object of the present invention to provide an ultra high speed camera capable of the reproduction of discrete images at a repetition rate far in excess of any framing camera heretofore known to the art. This is accomplished by the use of a dual optical system in combination with a single rotating optical mirror.

It is another object of this invention to provide a rotating mirror camera which achieves a product of frame area and repetition rate not possible in cameras heretofore known to the art.

It is a further object of this invention to provide a rotating mirror camera which makes optimum use of the mirror size for a specified image size and optical relative aperture.

Figure 2:
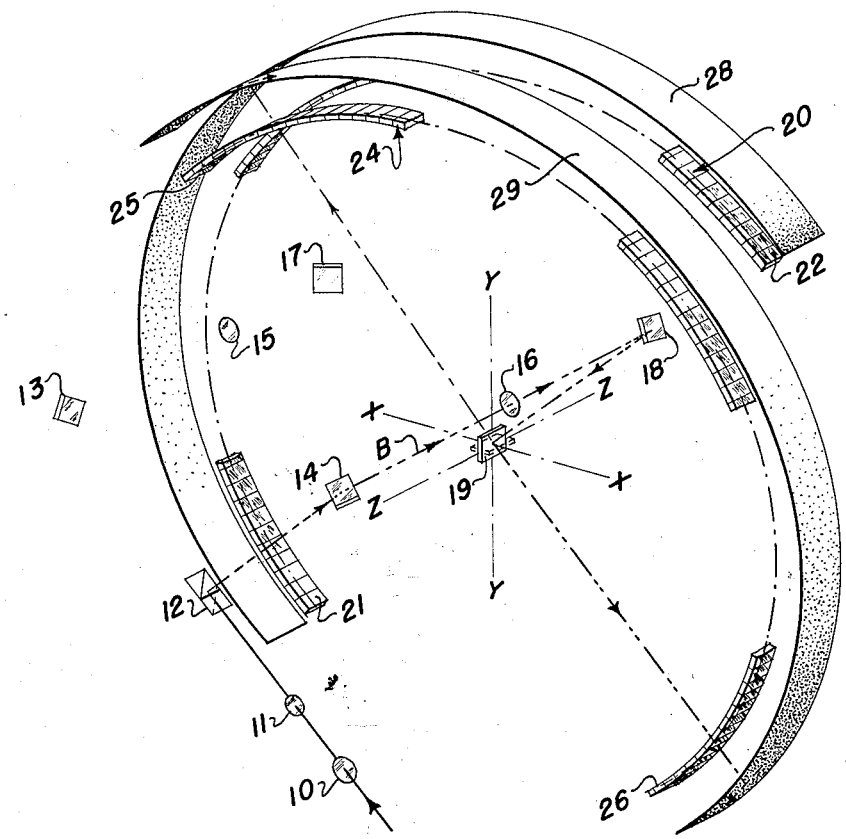
Figure 3:
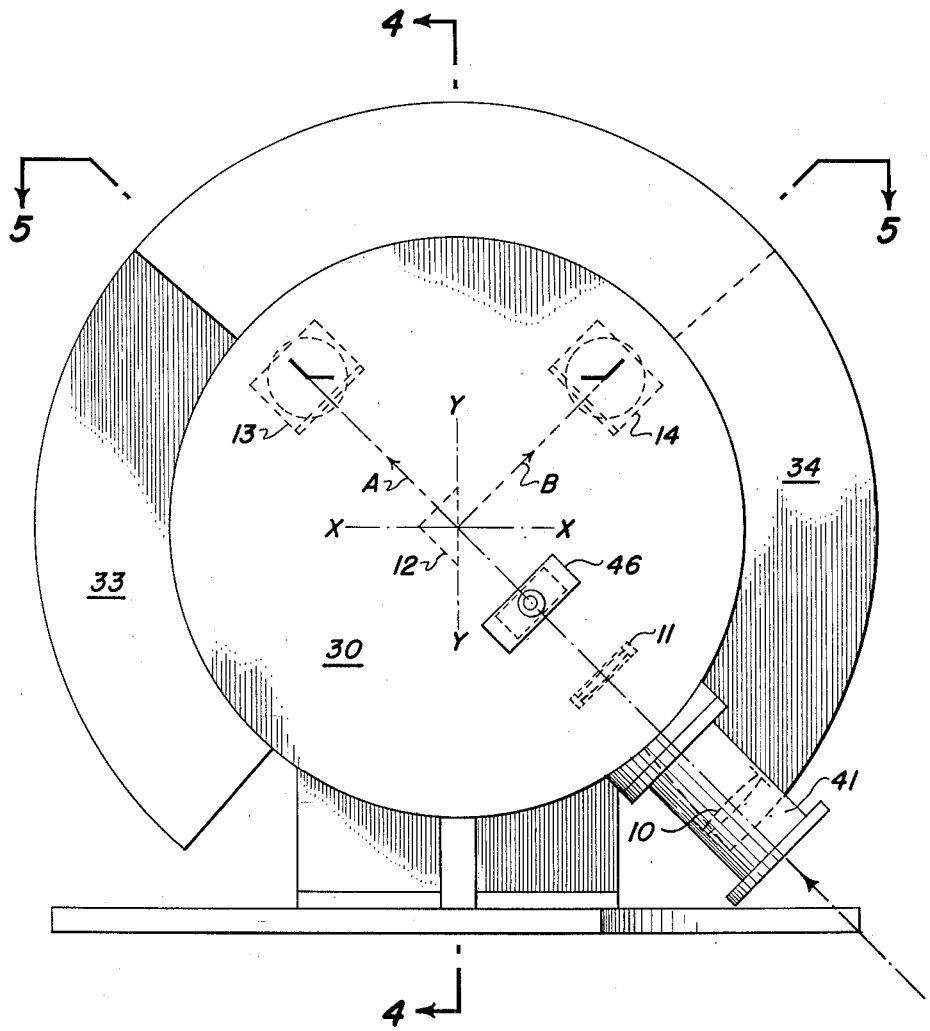
Figure 4:
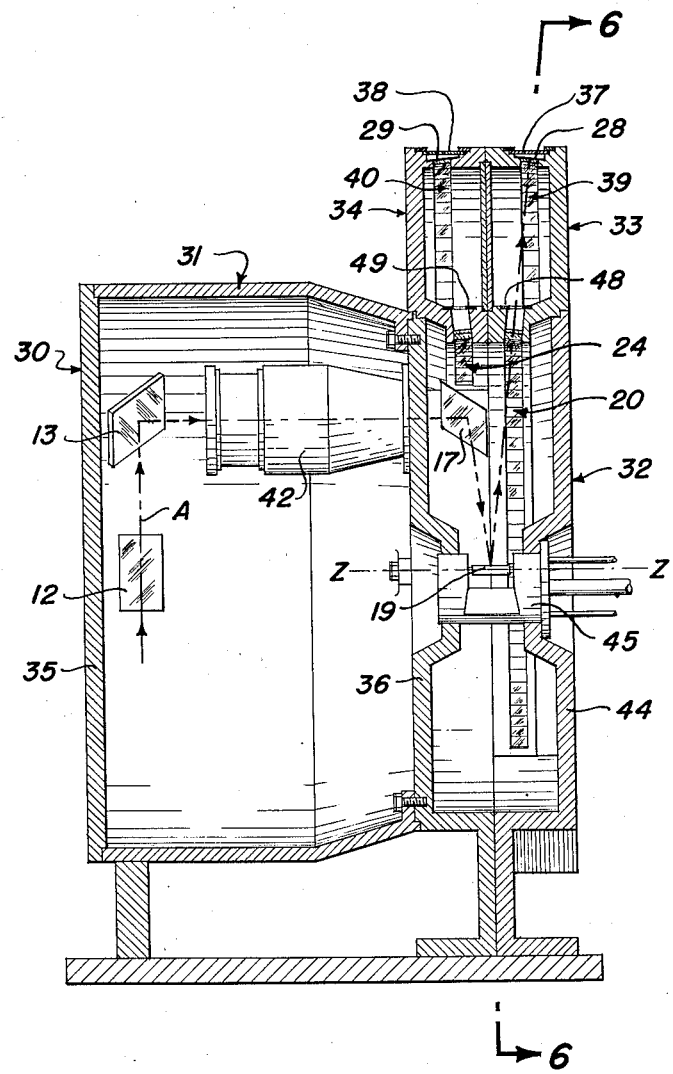
Figure 5:
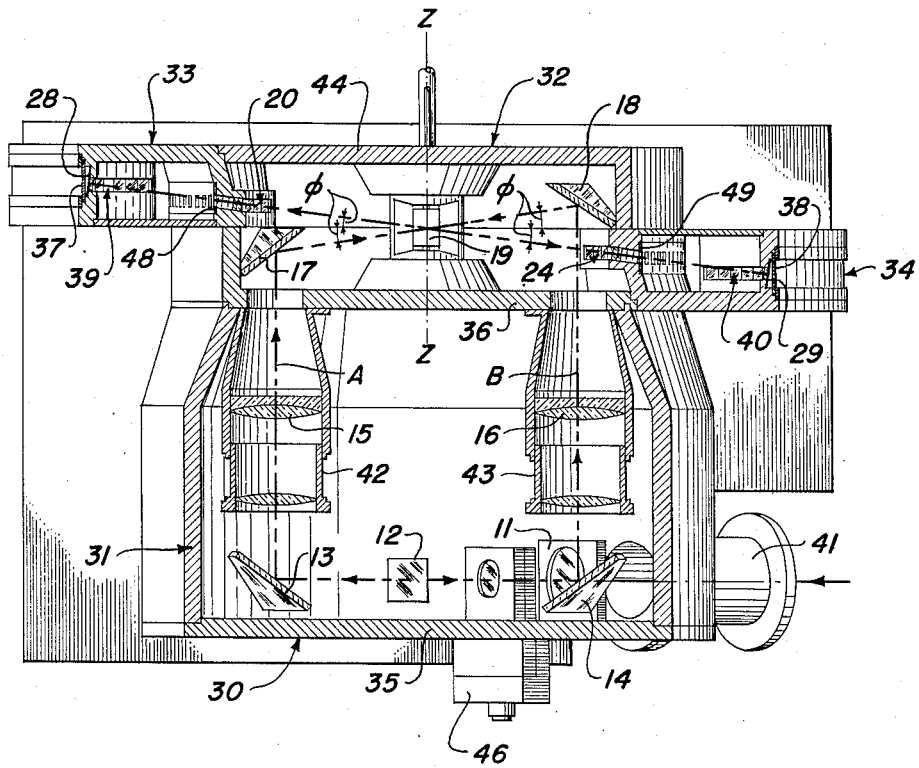
Figure 6:
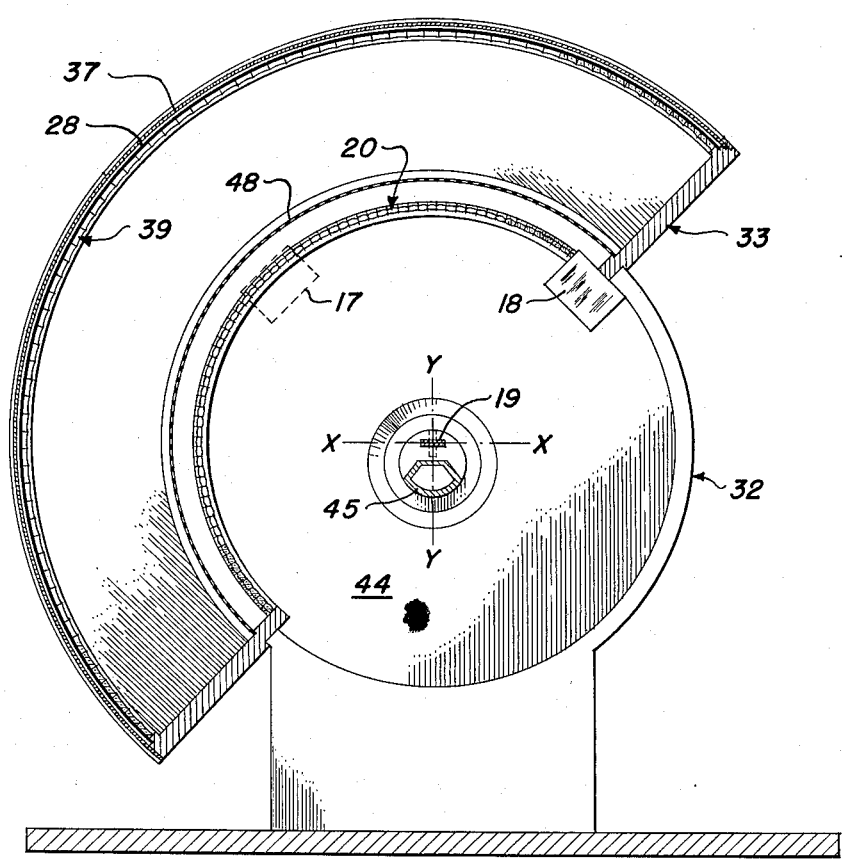
Figure 7:
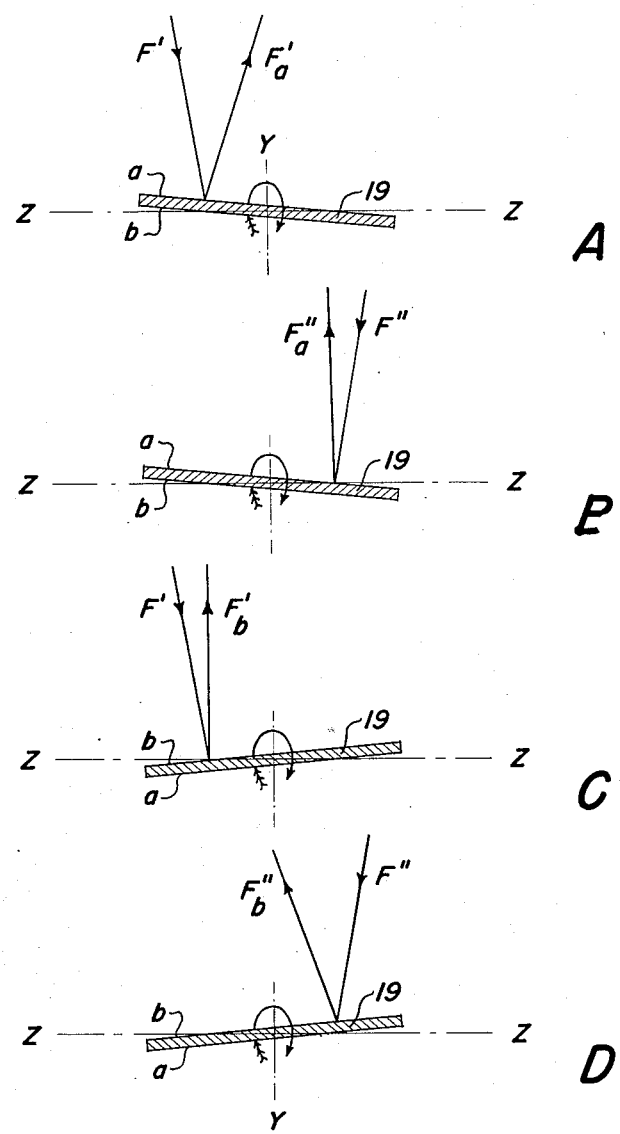

Other objects and advantages of the present invention will be apparent to those skilled in the art from the following description of a preferred embodiment as illustrated in the accompanying drawings made a part of this specification in which:

Figure 1 is an isometric schematic drawing of the optical components and systems of the camera and shows the path of the light and image during the phase of operation in which the first system of the dual optical system is effective, Figure 2 is likewise a schematic drawing of the optical components and systems of the camera showing the path of the light and image during the phase of operation in which the second system of the dual optical systems is effective, Figure 3 is a view in elevation of the outer end of the assembled camera with the polar axes shown to illustrate the polar orientation of the various optical components, Figure 4 is a sectional view taken on line 4—4 of Figure 3, Figure 5 is a plan view taken generally on line 5—5 of Figure 3, Figure 6 is a sectional view taken generally on line 6—6 of Figure 4, and Figure 7 is an isometric schematic drawing showing varying positions of the rotating mirror in an alternate embodiment of the present invention.

The camera described herein utilizes a rotating mirror to reproduce event images on a stationary film and, further, attains an extremely rapid image rotation by the operation of the mirror in combination with a dual optical system.

Referring to the drawings, similar reference numerals refer to like parts throughout the several views. Referring now particularly to Figures 1 and 2, the optical system of the camera described herein is shown diagrammatically.

The complete optical system of the present invention comprises a primary objective lens 10, a field lens 11 and a beam splitter 12 followed optically by two identical optical systems each of which comprises a first deflecting mirror 13, 14, a combination relay and field lens 15, 16, a second deflecting mirror 17, 18, a rotating mirror 19 common to both systems, an arcuate, series of final relay lenses 20, 24, and an arcuate strip of photosensitive film 28, 29. Thus, it may be seen that two identical optical systems employing a common rotating mirror and common initial image forming and beam splitting optical elements are used to reproduce two sequential series of event images as described hereinafter.

As is well known in the art, certain difficulties other than reduced bursting speed are inherent in rotating mirror cameras in which the mirror is required to be relatively thick or have more than two reflecting surfaces. Since rotating balance requires the mirror to be symmetrical about its axis of rotation, the surface of a thick mirror, being substantially removed from the axis, will cause the reflecting surface to slide beneath the image or cause the image to be split by two adjoining reflecting faces. It is necessary in the prior art, therefore, that the rotation of thick mirrors in which reflection is produced be limited to much less than 90°. The present invention, however, allows the utilization of a thin plate-like two faced mirror which can reflect a complete image through 90° of mirror rotation.

The use of a rotating mirror and single optical system or an optical system transmitting a single image source upon the rotating mirror limits the effective amount of rotation of the mirror during which frames may be reproduced to 90°, since image reproduction by means of mirror reflection is effective, for practical purposes, only over a mirror angle of ±45° with respect to the light source upon the mirror.

The optical systems of the present invention are positioned within a camera housing as described hereinafter to transmit two identical images substantially at the surfaces of the rotating mirror but from sources positioned 90° out of phase with respect to the mirror rotation.

Thus, referring to Figures 1 and 2, the rotating mirror 19 has an axis of rotation Z—Z which may also be considered to be the center line of the camera. For further orientation and simplicity of explanation, the Y—Y axis or vertical position of the rotating mirror 19 in Figures 1 and 2 may be assumed to be the 0° polar position of the rotating mirror and camera in the X—Y plane.

From a beam splitter 12 two light beams of equal intensity are emergent. Ligth path A is directed through the first optical system as shown in Figure 1, while light path B is directed through the second optical system as shown in Figure 2. By an arrangement of components as described hereinafter in conjunction with the presently preferred embodiment of this invention the second deflecting mirror 17 of the first optical system (Figure 1) is positioned to transmit an event image in space substantially at the face of the rotating mirror 19 from a polar position corresponding to 315°. In like manner, the light beam of the second optical system will be directed by the second deflecting mirror 18 of the second optical system (Figure 2) to form an image in space substantially at the face of the rotating mirror 19 from a polar position of 45°.

The arcuate series of final relay lenses 20 of the first system is then positioned concentrically about the center line of the camera having the optical axes of the lenses coincident with a shallow conic surface having its apex substantially at the center of the mirror 19 and its axis substantially coincident with the axis of rotation Z—Z of the rotating mirror 19, as described hereinafter. Since the image source upon the rotating mirror 19 is projected from the polar position of 315° the rotating mirror may reflect the image at its surface through an angle of incidence ±45° from the source. The rotating mirror 19 will thus reflect the image from a mirror position at which the reflecting surface lies in the vertical position, or in the plane corresponding to 0°–180°, to the mirror position at which the reflecting surfaces lies in the plane corresponding to 90°–270°, and since an angle of incidence of 45° will result in a combined angle of incidence and reflectance of 90°, images will be reflected upon the final relay lenses 29 from a polar position of 315°±90°. Therefore, the arcuate series of final relay lenses 20 of the first system extend concentrically about the rotating mirror 19 from a polar position of 225° to 45°. The corresponding film strip 28 lies in the plane of the optical axis through the final relay lenses from the rotating mirror 19 and is concentric with the final relay lenses 20 at the proper radius to reproduce the image as reflected from the rotating mirror 19 and transmitted by the final relay lenses.

Similarly, since the image from the second optical system (Figure 2) is projected upon the rotating mirror (Figure 2) from the deflecting mirror 18 at the polar position corresponding to 45°, the rotating mirror 19 will reflect the image from the mirror position at which the reflecting surface lies in the plane corresponding to 90°–270° to the position at which the reflecting surface lies in the plane corresponding to 180°–0° and the reflected images will extend from a polar position of 315° to 135°. The second arcuate series of final relay lenses 24 and the film strip 29 are therefore positioned on radii equal to that of the first system but extending from the polar position of 315° to 135°.

In order to avoid the blind area in the center of each image series which would result if the rotating mirror 19, deflecting mirrors 17, 18, and film strips 28, 29, all lay in a common plane, and to allow the necessary overlap in the final relay lenses and film strips, a slight offset from the X—Y plane in each system must be provided. The deflecting mirror 17 is therefore offset on an angle $\phi$ from the near side of the X—Y plane, which is the plane normal to the axis of the rotating mirror 19, as shown in Figure 5, and the final relay lenses 20 and film strip 28 are offset an equal angle $\phi$ from the far side of the plane. The deflecting mirror 18 of the second system is offset an angle $\phi$ from the far side of the plane normal to the rotating mirror and the relay lenses 24 and film strip 29 are offset an equal angle $\phi$ from the near side of the normal plane. This necessary offset produces the two shallow conic sections upon which the light path is swept.

Thus, in operation, during the recording time of the camera the deflecting mirrors 17, 18, of each system project simultaneous event images in space substantially at the reflecting surface of the rotating mirror 19. As the rotating mirror reaches the polar position at which its reflecting surface lies in the Y—Z plane of Figure 1 the event image focused at its reflecting surface from the deflecting mirror 17 strikes it at an angle of incidence of 45° and is reflected, having a total angle of incidence and reflectance equal to 90°, thus passing through the relay lens 21 in the arcuate series 20 to produce an image on the film strip 28 in the polar position of 225°. As the rotating mirror 19 further rotates the image transmitted by the deflecting mirror 17 will be transmitted through each lens in the arcuate series of final relay lenses 20 in sequence and a corresponding image produced for each relay lens in the series on the film strip 28, until the rotating mirror 19 reaches the position where its reflecting surface lies in the X—Z plane. At this time the angle of incidence of the image projected from deflecting mirror 17 is again 45° and an image is reproduced through relay lens 22 on the film strip 28 at the polar position of 45°.

Referring now to Figure 2, as the rotating mirror 19 reaches the position where its reflecting surface lies in the X—Z plane the event image directed upon the surface from deflecting mirror 18 at the polar position of 45° will also strike the reflecting surface of the rotating mirror 19 at an angle of incidence equal to 45°, and having a total angle of incidence and reflectance equal to 90° will produce an image on the film strip 29 through the first relay lens 25 in the second arcuate series at the polar position corresponding to 315°. At this point, therefore, the first optical system has completed its operation and the second system has become effective. The rotating mirror 19 will then reproduce an image upon the film strip 29 through each relay lens in the second arcuate series 24 as the rotating mirror revolves through the next 90°. As the mirror 19 reaches the position where its reflecting face lies in the Y—Z plane a final image will be reproduced through relay lens 26 at the polar position of 135°. Thus, in a recording cycle the rotating mirror 19 has rotated through 180° and a film series of 360° has been produced. The rotating mirror has both faces as reflecting surfaces, therefore, as the first reflecting surface reaches the Y—Z plane the opposite surface lying in the same plane will commence another cycle if no shutter action is provided. It should be noted that there are two event images at the reflecting surface of the rotating mirror at all times, however, the different displacements of the arcuate series of final relay lenses away from the X—Y plane insures that only one reflection reaches a relay lens at any one time. For this reason, and due to the fact that both faces of the rotating mirror are polished there is no problem of event and mirror synchronization.

Referring particularly to Figures 3, 4, 5 and 6, the presently preferred embodiment of a camera utilizing the dual optical system discussed supra is shown.

The camera housing 30 comprises, as shown in Figure 5, four structural sections designated as the primary housing 31, the secondary housing 32, and two film housings 33, 34.

The primary housing 31 is a cylinder having both ends open with a short taper at one end to the diameter of the secondary housing. The outer end of the primary housing is enclosed by a flat end plate 35 which is rigidly affixed thereto.

The secondary housing 32 is a closed cylinder which mates with, and is rigidly affixed to, the inner end of the primary housing 31, thus dividing the main portion of the camera housing 30 into two chambers closed at both ends and having a common wall 36 therebetween. The height of the secondary housing is substantially equal to the combined height of the film housings 33, 34, and has a diameter determined by the optical system as shown hereinafter.

The film housings 33, 34, are similar, each being a segment of an annular ring having an arc substantially equal to 180° and a cross section of hollow rectangular shape. The inner radius of the film housings 33, 34, is open and formed to accommodate the continuous arcuate series of final relay lenses 20, 24 (see Figures 4, 5). The outer radius of the film housing is open and grooved to accommodate the photosensitive film strip 28, 29 which is inserted and maintained in position by the film backing strip 37, 38 (Figure 4). A continuous arc of field flatteners 39, 40, is positioned in contact with the inner surface of the film to more accurately maintain it in position (Figure 6).

Two arcuate openings are provided in the circumference of the secondary housing 32 for the engagement of the film housings 33, 34. The openings through the circumference of the secondary housing are each equal in arc to the arc described by the arcuate series of final relay lenses 20, 24, on the inner radius of each film housing 33, 34 and are positioned 90° apart along the circumference. Referring to Figures 3 and 5, the circumferential opening for the second film housing 34 is located in the circumference of the secondary housing extending from a polar position corresponding to 315° to that of 135° and is in the half of the secondary housing 32 adjacent the primary housing 31. The circumferential opening for the first film housing 33 is positioned from a polar position of 225° to 45° and is in the half of the secondary housing adjacent the outer end of the secondary housing.

Thus, when the housing sections are assembled, the camera described herein has a primary cylindrical chamber and a secondary cylindrical chamber with a common wall therebetween, and two arcuate chambers extending radially from the secondary chamber in the positions described hereinbefore. All sections are symmetrical about a common centerline designated as the Z—Z axis of the camera.

A tubular focusing mount 41 for the primary objective lens 10 is rigidly affixed to the circumference of the primary housing 31 proximate the end plate 35 by flanges or similar lighttight fastening means. In accordance with the polar orientation used throughout this specification, referring to Figure 3, the tubular focusing mount 41 extends radially from the primary housing at a polar position of 135° with its centerline intersecting, and perpendicular to, the Z—Z axis through the camera housing. The primary objective lens 10 is mounted within the focusing mount 41 with the optical axis of the objective lens corresponding to the centerline of the tubular focusing mount.

Within the chamber formed by the primary housing 31 the field lens 11 and beam splitter 12 are rigidly positioned with their optical axes coinciding with the extension of the optical axis of the primary objective lens 10. The beam splitter employed in this embodiment is a half silvered prism which emits one light beam along an optical axis coincident with an extension of the optical axis of the entering light beam and emits a second light beam with an optical axis at right angles thereto. The beam splitter 12 is positioned with this dividing point, or optical center, located on the Z—Z axis of the camera. The first deflecting mirror 13 is rigidly positioned having its center located on the optical axis of light path A emergent from the beam splitter, or at 315° in polar orientation. The first deflecting mirror 14 of the second optical system is positioned with its center corresponding to the optical axis of light path B emergent from the beam splitter 12, or at a polar position corresponding to 45. Referring to Figure 5, the deflecting mirrors 13, 14, are inclined at an angle of 45° with respect to the plane of the light beams emergent from the beam splitter 12. The field lens 11, beam splitter 12 and deflecting mirrors 13, 14, are mounted on the end plate 35 with the optical center of the primary objective lens 10, field lens 11, beam splitter 12 and the deflecting mirrors 13, 14, all in a common plane which is, in turn, parallel to the end plate 35. The deflecting mirrors 13, 14, are thus inclined with their reflecting surfaces at an angle of 45° with respect to the common plane through their centers hereinafter referred to as the vertical plane.

The first combination relay and field lens 15 is mounted having its optical axis perpendicular to the vertical plane, i. e., horizontal and passing through the optical center of the deflecting mirror 13. The second combination relay and field lens 16 is similarly mounted with its optical axis horizontal and passing through the center point of the deflecting mirror 14. The combination relay and field lenses 15, 16, are mounted within adjustable tubular focusing mounts 42, 43, which are suspended from, and rigidly affixed to, the common wall 36 between the primary and secondary housings.

Apertures having a diameter equal to that of the focusing mounts 42, 43, at their bases and symmetrical about the centerlines of the mounts are provided through the common wall 36, thus providing uninterrupted passage of light paths A and B into the secondary housing through the combination relay and field lenses 15, 16.

Within the chamber formed by the secondary housing 32 on a rotor shaft is carried the rotating mirror 19 which is positioned having its geometrical centerline located on the Z—Z axis of the camera (Figures 4 and 5). The center point of the mirror lies also in the X—Y plane which is substantially midway between the common wall 36 and the outer end plate 44 of the secondary housing 32. The rotating mirror 19 and rotor shaft are supported and driven by an air turbine 45 or other suitable driving means which is, in turn, rigidly affixed to, and supported between, the common wall 36 and the outer end plate 44. Although various driving means may be used, it is necessary, in order to achieve a repetition rate of 3,500,000 frames per second, that the mirror 19 rotate at a speed of 10,000 revolutions per second. In the presently preferred embodiment described herein the rotating mirror used at such speed is a two faced mirror having optically flat reflecting surfaces 21 x 17½ mm. and is 8 mm. in thickness. An air turbine is used as a driving means with the rotor shaft of the mirror being an integral part of the turbine. Dual bucket wheels are fitted at each end of the mirror shaft which is carried in sleeve bearings, thus making the mirror shaft the rotor shaft of the turbine. The bucket wheel manifolds are so arranged that the exhaust air sweeps the bearing oil leakage out the exhaust pipe so that it will not deposit on the mirror and optics inside the camera. Necessary air and oil inlet and exhaust connections to the turbine or driving means extend through the outer end plate 44.

Within the chamber formed by the secondary housing 32 are the second deflecting mirrors 17, 18, of the two optical systems. As discussed supra in connection with the diagrammatic explanation of the present invention, it is necessary to offset the second deflecting mirrors with respect to the X—Y plane in order to achieve the desired sequential framing with a minimum of blind area. The second deflecting mirror 17 of the first optical system is positioned having its optical center on the optical axis through the combination relay and field lens 15 and offset a distance from the X—Y plane toward the common wall 36 such that a line from the geometrical center of the rotating mirror 19 to the optical center of the deflecting mirror 17 forms an angle $\phi$ with the X—Y plane. Therefore, in order that the light path A through the combination relay and field lens 15 of the first optical system is directed by the deflecting mirror 17 toward the center of the rotating mirror 19 the deflecting mirror 17 must be inclined at an angle of $45° + \frac{1}{2}\phi$ counterclockwise from the X—Y plane.

Similarly, the second deflecting mirror 18 of the second optical system is offset an equal distance from the X—Y plane toward the outer end plate 44 with its optical center on the optical axis of the combination relay and field lens 16. Thus, in order that the light path B through the combination relay and field lens 16 is directed by the deflecting mirror 18 toward the center of the rotating mirror 19, the deflecting mirror 18 must be inclined at an angle of $45° - \frac{1}{2}\phi$ clockwise from the X—Y plane.

Since the angle of incidence of light path A from the deflecting mirror 17 to the rotating mirror 19 is equal to the angle $\phi$ from the inner side of the normal, or X—Y, plane the light will be reflected at an equal angle $\phi$ from the outer side of the X—Y plane. The optical components of the first optical system within the film housing 33 will then be located having their optical axes coincident with the line of the light path A from the center of the rotating mirror 19 at the angle $\phi$ with the normal to the rotating mirror 19 (Figure 4). The arcuate series of final relay lenses 20 of the first system are therefore equally spaced along the inner radius of the film housing 33 having their optical axes lying in the conic section formed by the revolution of light path A. In the present embodiment eighty-five relay lenses are used in each arcuate series but this number, of course, may be varied in accordance with the repetition rate and number of frames desired.

Similarly, the final relay lenses in the second arcuate series, referring to Figure 5, are positioned having their optical axes coincident with light path B which is reflected from the rotating mirror 19 at an angle $\phi$ from the inner side of the X—Y plane.

The outer radius walls of the film housings 33, 34 are formed with openings therethrough into which are inserted a continuous arcuate series of optical field flatteners 39, 40, which act also to position the photo-sensitive film strips 28, 29 on the proper radius. The film strips are positioned adjacent the outer radii of the field flatteners and maintained in contact therewith by the film backing strips 37, 38, which are inserted in grooves provided in the film housings.

Through the end plate 35 of the primary housing a high speed light shutter 46, such as the ultra high speed light shutter described in copending application number 330,132, filed January 7, 1953, by Berlyn Brixner, is inserted in the entering light path between the field lens 11 and beam splitter 12. A view finder, not shown, is also inserted through the end plate 35 in the light path proximate the light shutter 46.

It is obvious to one skilled in the art that there are numerous possible arrangements of reflecting mirrors and optical lenses which may be placed between the object to be photographed and the rotating mirror to produce the images at the surface of the rotating mirror. It is also apparent to one skilled in the art that the optical characteristics of the final relay lenses in the first and second arcuate series may be varied according to the magnification and resolution of the image desired on the final film record. In the presently preferred embodiment described herein acromatic doublet lenses are used throughout, since these give excellent resolution over the small angular field required.

The focal lengths assigned to the various lenses and the spacing of the components is such that an event image is produced at the field lens 11, and at the surface of the rotating mirror 19 and at the photosensitive film strips 28, 29.

It is apparent that inasmuch as the event image is produced at the surface of the rotating mirror, more than one of the final relay lenses in the arcuate series will "see" the reflection of the image in the rotating mirror at each position of the mirror as it revolves. It is necessary, therefore, that a stop system be incorporated into the camera to produce illumination on only one of the final relay lenses at any one time in the rotating cycle. Such stop systems in combination with drum type cameras are well known in the art. In the present embodiment, diamond shaped pupils are employed for optimum time resolution, although pupils of any shape may be used.

A diamond shaped stop pupil, not shown, is inserted proximate the primary objective lens 10 and by means of the focal lengths assigned to the various lenses and the spacing between the lenses a light pupil is produced at the beam splitter and relayed to be again produced at a final relay lens. An arcuate series of diamond shaped stop pupils 48, 49, is then placed proximate the first and second arcuate series of relay lenses, having the stops equal in number to the relay lenses with each having its center on the optical axis of the corresponding final relay lens.

In operation, therefore, with the light shutter open the primary objective lens 10 forms an image of the event in the field lens 11. The beam splitter 12 then divides the light from the field lens 11 into light paths A and B. Light path A is deflected by the deflecting mirror 13 into the combination relay and field lens 15, after which it is deflected by the second deflecting mirror 17 to form an event image in space substantially at the surface of the rotating mirror 19 from the position described hereinbefore in conjunction with the diagrammatic description of this invention. Simultaneously, light path B from the beam splitter 12 is deflected by the deflecting mirror 14 through the combination relay and field lens 16 where it is again deflected by the second deflecting mirror 18 to form an event image in space at the surface of the rotating mirror 19 from a position varying by 90° from the image produced by light path A. The images are then reflected sequentially by the rotating mirror 19 through each of the relay lenses in the two arcuate series 20, 24, as described hereinbefore, to again form an image corresponding to each relay lens upon the film strips 28, 29.

Also, the field lens 11 forms an image of the objective lens pupil at the beam splitter 12, which is then relayed by the combination relay and field lenses 15, 16, along light paths A and B to strike the rotating mirror 19 and again produce a pupil image at a single relay lens. The relay lens at which the image is produced is dependent upon the position at which the mirror 19 is located in its rotation. It is understood that the two images at the surface of the rotating mirror 19 remain substantially stationary in space as the mirror rotates. However, the pupil being image on the radius of the series of final relay lenses will rotate as the mirror rotates. Thus, isolating a single final relay lens for illustration, the portion of the film strip corresponding to this final relay lens will "see" a stationary reflection of the event image on the rotating mirror surface. Since the pupil rotates past the relay lenses and strikes only one at any given instant of time, the image "seen" through the relay lens will only be illuminated as the pupil sweeps past that lens. Without the stop system which confines the light to one single relay lens at a given time, the light would pass into several adjacent relay lenses simultaneously and hence not give a sharp separation in time of the various frames.

As an alternated embodiment, the basic camera and preferred embodiment described hereinbefore may be altered to produce a recording time twice as great by utilizing 360° of mirror rotation without double exposure. Referring to Figure 7, this is accomplished by mounting the rotating mirror 19 so that the axis of rotation of the rotating mirror is not parallel to the plane of the mirror faces which remain parallel, thus producing a wobbling rotation.

As the mirror 19 rotates through 180°, therefore, the first reflecting surface will produce 360° of framing as described above, and as the mirror rotates from 180° to 360° the second reflecting surface will receive the beam reflected from the deflecting mirrors 17 and 18. Since the axis of rotation does not lie in the plane of the reflecting surfaces, the second mirror surface during the reflection will not lie in the same plane as did the first surface and as a result the beam reflected therefrom will be displaced from the images produced by the first 180° of rotation. A third and fourth series of relay lenses and two film strips are therefore positioned parallel to the first and second series respectively but are displaced laterally to receive the beam and reproduce the images as described hereinbefore. In a practical embodiment, a third and fourth series of relay lenses are positioned adjacent the first and second series and each series of lenses frames on one half the width of the film strip. In operation, therefore, referring to Figure 7-A, as the mirror 19 rotates about the Z—Z axis through the first 90° of mirror rotation the reflected beam F' from the mirror 17 is directed from the rotating mirror as F'a through the first series of relay lenses; during the second 90° of rotation, as in Figure 7-B, the rotating mirror 19 receives beam F'' from the deflecting mirror 18 and directs beam F''a through the second series of lenses; as the rotating mirror 19 begins the third 90° of rotation, Figure 7–C, it again receives the beam F', but since the face of the rotating mirror now lies in a different plane the angle of incidence is changed and the beam F'b is directed into the third series of relay lenses, which are laterally adjacent the first series. Similarly, referring to Figure 7–D, the beam F''b is offset in the fourth quadrant of rotation from F'b and is directed through the fourth series of relay lenses which are positioned adjacent the second series. Therefore, a full 360° of mirror rotation may be utilized with a resulting recording time twice as great as that obtained when the rotating mirror revolves symmetrically about its axis of rotation.

It will thus be seen that what has been described herein is a stationary film, rotating mirror camera utilizing a thin, two-faced rotating mirror in combination with a dual optical system which makes possible a product of frame area and repetition rate not possible in cameras heretofore known to the art.

Modification and changes in the number and arrangement of the parts may be made by those skilled in the art without departing from the invention, within the scope of what is hereinafter claimed.

What is claimed is:

1. In a device for taking high speed photographs, rotating means for reflecting light beams comprising a thin, two-faced rotating optical mirror; means for transmitting light from the object to be photographed to focus and form two stationary images in space substantially at the reflecting surface of said rotating reflecting means and from different angular positions with respect to the rotation of the reflecting means, comprising a primary image forming means, a means for dividing the primary light beam into two identical beams, and a dual optical system for relaying and focusing the two beams; means for receiving and refocusing the two reflected light beams at various angular positions to form a series of stationary discrete images displaced from each other in time and in position on two photosensitive film strips.

2. In a device for taking high speed photographs, a rotating, thin, two-faced optical mirror; an optical system for directing and focusing light from the object to be photographed to form two images in space substantially at the reflecting surface of said rotating mirror and from different angular positions with respect to the rotation of said mirror, said optical system comprising common primary image forming elements followed optically by an optical beam splitter and a dual system of optical elements and deflecting mirrors to focus and direct the two light beams to the rotating reflecting surface; a multiplicity of receiving and refocusing means to receive and refocus the reflected light beams to form a multiplicity of discrete stationary images at various angular positions on two photosensitive film strips.

3. In a device for taking high speed photographs, rotating reflecting means comprising a rotating, thin, two-faced optical mirror; optical means for directing and focusing light from the object to be photographed to form two images in space substantially at the reflecting surface of said rotating mirror from directions offset by small equal angles on opposite sides of the perpendicular to the reflecting surface of said mirror and from angular positions varying by 90° with respect to the mirror rotation, said optical means comprising initial image forming optical elements followed by a 90° beam splitter and two similar optical systems comprising a combination relay and field lens and deflecting mirrors to focus and direct the two light beams emergent from said beam splitter; and means for refocusing the light beams reflected by said rotating mirror to form sequential discrete images on photosensitive film strips.

4. In a high speed photographic device, a rotating reflecting means comprising a rotating, thin, two-faced optical mirror; an optical system comprising in combination a primary objective lens, a field lens, and a half-silvered beam splitter on a common optical axis, followed optically by first and second similar optical systems each of which comprises a combination relay and field lens and deflecting mirrors to direct and focus the two light beams emergent from said beam splitter to form two identical images in space substantially at the reflecting face of said rotating mirror; said images being directed by said first and second optical systems from directions offset by equal small angles $\phi$ from opposite sides of the plane of rotation of said rotating mirror and from positions differing by 90° in said plane of rotation; means for directing and refocusing the first and second images reflected by said rotating mirror to form two sequential series of discrete images upon two photosensitive film strips, said means comprising a first and second 180° arcuate series of relay lenses, said lenses being equal in number to the frames desired, said first arcuate series of relay lenses being positioned concentric with the axis of rotation of said rotating mirror and with the optical axes of said relay lenses substantially coincident with a shallow substantially conic surface defined by the path of reflection of said first image, said conic section having its apex substantially at the center of said rotating mirror and its axis substantially coincident with the axis of rotation of said rotating mirror and extending +90° and −90° in the plane of rotation from the position from which said first image is directed toward said rotating mirror, said first photosensitive film strip being positioned concentric to said first arcuate series of relay lenses at a proper radius to receive the multiplicity of images through said relay lenses; said second arcuate series of relay lenses and said second photosensitive film strip being positioned with the optical axes of said relay lenses substantially coincident with, and the plane of said photosensitive film strip substantially perpendicular to, an opposing conic surface similar to said first arcuate series to relay, refocus, and record the rotating reflection of said second image.

BERLYN BRIXNER.

References Cited in the file of this patent

UNITED STATES PATENTS

| Number | Name | Date |
|---|---|---|
| 2,400,887 | Miller | May 28, 1946 |

FOREIGN PATENTS

| Number | Country | Date |
|---|---|---|
| 668,681 | Great Britain | Mar. 19, 1952 |